E. M. VAN HOESEN & N. H. BROWN.
Car-Coupling.
No. 8,412. Reissued Sept. 10, 1878.
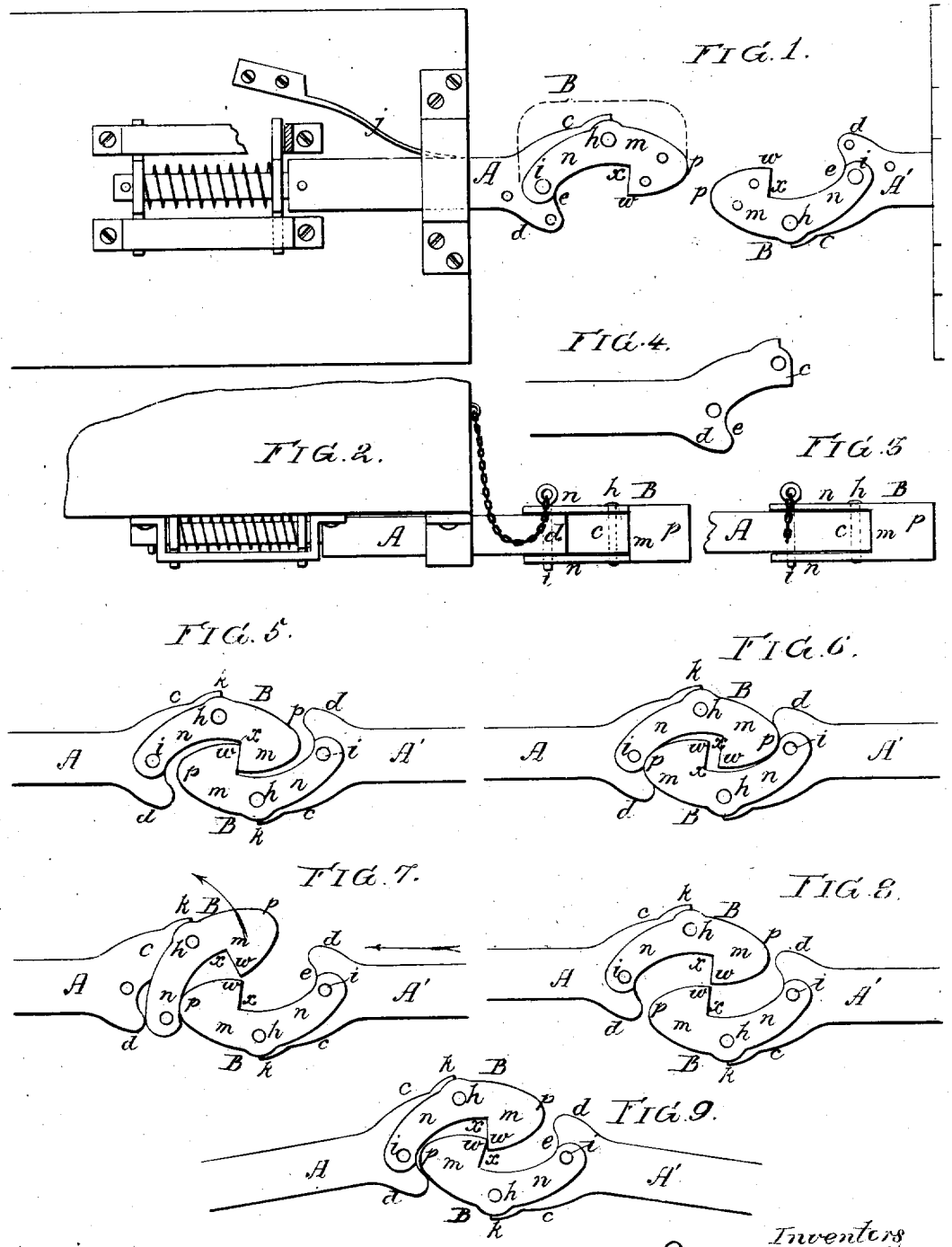
Witnesses,
Henry Howson Jr.
Harry Smith
Inventors
Eugene M. Van Hoesen
and
Nelson H. Brown
by their Attorneys
Howson and Sons
THE NORRIS PETERS CO., PHOTO-LITHO., WASHINGTON, D. C.

UNITED STATES PATENT OFFICE.

EUGENE M. VAN HOESEN AND NELSON H. BROWN, OF SYRACUSE, N. Y.

IMPROVEMENT IN CAR-COUPLINGS.

Specification forming part of Letters Patent No. 119,431, dated September 26, 1871; Reissue No. 7,922, dated October 23, 1877; Reissue No. 8,412, dated September 10, 1878; application filed June 18, 1878.

*To all whom it may concern:*

Be it known that we, EUGENE M. VAN HOESEN and NELSON H. BROWN, of Syracuse, Onondaga county, New York, have invented certain Improvements in Car-Couplings, of which the following is a specification:

The main object of our invention is to so construct each draw-head of a twin coupling, and to provide each draw-head with such a pivoted hook or hooked lever, that the hook of one draw-head may be interlocked with or released from that of the other draw-head, the construction and operation of the twin coupling being too fully described hereinafter to need preliminary explanation.

In the accompanying drawing, Figure 1 is an inverted plan view of our improved twin coupling; Fig. 2, an inner-side view of the same; Fig. 3, an outer-side view; Fig. 4, a detached view of the draw-head; Figs. 5 to 9, diagrams illustrating the operation of the coupling.

Each of the draw-heads A A′ is provided with two fingers or projections, *c* and *d*, between which is the cavity *e*, referred to hereinafter.

A lever, B, is loosely pivoted by a pin, *h*, to the longer projection, *c*, of the draw-head, this lever having two arms, *m* and *n*, the former of which is hooked, as shown. Hence this element of our invention may be termed a "pivoted hooked lever" or a "pivoted hook," which may be locked to the draw-head by a pin, *i*, passing through the long arm, *n*, and through the said draw-head. It should be understood that the lever B, when unlocked, is free to vibrate, being entirely uncontrolled by springs or other devices.

The operation of the twin coupling may be best understood by reference to the views, Figs. 5 to 9. In Fig. 5 the coupling is under tension, the pivoted hooks, which are secured to their respective draw-heads by the pins *i*, being interlocked.

It will be observed that the hooks are so beveled where they are in contact with each other that the projecting point *w* of one hook shall fit into the recess *x* of the other. Hence, when the hooks are secured each to its draw-head, they will be self-retaining in an interlocked condition.

Fig. 6 shows the condition of the twin coupling when the two parts are bumped together, the nose of the pivoted hook of one draw-head fitting into the cavity *e* of the other draw-head. When the noses of the hooks are thus brought into violent contact with the draw-heads the said hooks cannot yield, as they are locked to, and are essentially parts of, their respective draw-heads.

In Fig. 7 the locking-pin *i* has been withdrawn from the draw-head A, and its pivoted hook has been moved in the direction of the arrow to an extent permitted by a shoulder or stop, *k*, on the said draw-head.

When the draw-head A′, with its locked pivoted hook, is moved in the direction of its arrow, the nose *p* of the said hook will strike the arm *n* of the other pivoted hook, and the result will be the interlocking of the two pivoted hooks, after which the arm *n* of the hook B may be locked to its draw-head A by the pin *i*.

The manner in which the twin coupling, while under tension, may be uncoupled by withdrawing the locking-pin *i* of one or other of the draw-heads will be readily understood.

In order to make the device self-coupling, when the pivoted hooks of both draw-heads are locked, we combine each draw-head, which, as usual, is free to move laterally to a limited extent, with a spring, *j*, Fig. 1, the springs tending to force the two draw-heads toward each other.

When two cars meet, each having a draw-head with locked pivoted hook, the nose of the hook of one draw-head will strike that of the other, and both draw-heads will yield laterally, the noses of the two hooks sliding against each other until they reach the relative position shown in Fig. 8, when the hooks will be interlocked by the tendency of the springs *j* to force the draw-heads laterally toward each other, the fingers *d* being short enough to permit this interlocking. These fingers, however, act as guards in preventing uncoupling under circumstances which afford the greatest inducement for the device to become uncoupled—that is, when the cars are turning a curve, in which case the twin coupling will assume the condition shown in Fig. 9, the finger *d* of one draw-head becoming a guard to prevent the lateral escape of the nose of the pivoted hook of the other draw-head.

As shown in Figs. 2 and 3 of the drawing, the arm *n* of each pivoted hook is composed of two plates, between which the draw-head fits.

The draw-head between the projections *c* and *d* may be mortised to admit an ordinary coupling-link, which can be locked by the pins *i*, so that a car having the ordinary link-coupling can be connected to a car having our improved coupling.

We claim as our invention—

1. A twin coupling each part of which has a draw-head combined with a hook loosely pivoted to a projection on the said draw-head, so as to swing freely thereon, substantially as described.

2. The combination of a pivoted hook with a draw-head having the guard-finger *d*, substantially as described, for the purpose specified.

3. The combination, in a twin coupling, of a pivoted hook or lever carried by one draw-head, and having an arm to be operated by the nose of the pivoted hook of the other draw-head in effecting a coupling, substantially as described.

4. In a twin coupling, the combination of a draw-head and pivoted hook with a device for locking the arm *n* of the said hook to the draw-head.

5. The combination, in a twin coupling, of a draw-head having a pivoted hook and a device for locking the same, with a cavity, *e*, in the other draw-head for receiving the nose of the said pivoted hook.

6. The combination of a pivoted hook with a draw-head capable of moving laterally under the control of a spring, substantially as described.

In testimony whereof we have signed our names to this specification in the presence of two subscribing witnesses.

EUGENE M. VAN HOESEN.
NELSON H. BROWN.

Witnesses:
E. M. MYERS,
J. H. HINMAN.